(12) United States Patent
Gelotte et al.

(10) Patent No.: US 6,248,841 B1
(45) Date of Patent: Jun. 19, 2001

(54) ELASTOMER TREATMENT PROCESS TO DECREASE PEROXIDE LEVELS

(75) Inventors: Karl M. Gelotte; Joseph D'Silva, both of North Wales, PA (US)

(73) Assignee: Aventis Pharmaceuticals Products Inc., Bridgewater, NJ (US)

( * ) Notice: Subject to any disclaimer, the term of this patent is extended or adjusted under 35 U.S.C. 154(b) by 0 days.

(21) Appl. No.: 09/355,693

(22) PCT Filed: Feb. 4, 1998

(86) PCT No.: PCT/US98/02068

§ 371 Date: Sep. 30, 1999

§ 102(e) Date: Sep. 30, 1999

(87) PCT Pub. No.: WO98/33827

PCT Pub. Date: Aug. 6, 1998

Related U.S. Application Data

(60) Provisional application No. 60/037,375, filed on Feb. 4, 1997.

(51) Int. Cl.$^7$ .................. C08F 8/00; C08F 8/04
(52) U.S. Cl. .............. 525/343; 525/331.8; 525/344; 525/350
(58) Field of Search ................... 525/343, 344, 525/350

(56) References Cited

U.S. PATENT DOCUMENTS

Re. 32,028 * 11/1985 Fischer ................. 525/194
3,468,855   9/1969   Hunter .
3,607,830   9/1971   Kearnan et al. .
3,925,333   12/1975  Valvassori et al. .
3,957,919 * 5/1976   Von Bodungen et al. .......... 525/343
5,667,858   9/1997   Pokorny .

* cited by examiner

Primary Examiner—Bernard Lipman
(74) Attorney, Agent, or Firm—Irving Newman

(57) ABSTRACT

A novel process has been developed for the treatment of crosslinked ethylene-propylene diene monomer (EPDM) elastomer material to decrease its residual peroxide levels. EPDM is used to form the seats and neck gaskets of metering valves used in metered-dose inhalers (MDI). For filled and inverted MDI units these EPDM components are in direct contact with the pharmaceutical formulation media. The process involves exposing the EPDM valve components to a solution of 2-mercaptoethanol, a chemical reducing agent. The 2-mercaptoethanol greatly diminishes the residual peroxide levels in EPDM by reducing the peroxide functional groups to the corresponding hydroxyl groups. EPDM components treated in this manner have demonstrated very low peroxide levels and, consequently, greatly improved compatibility with the pharmaceutical formulation in the inhaler. An advantage of this approach is that the treated EPDM would likely retain its favorable physical properties and its good performance in metering valves. In this work 2-mercaptoethanol was used as the model reducing agent. It is believed, however, that similar positive results can be obtained using other reducing agents, notably other volatile compounds containing sulfur in one of its lower valence states (i.e. other thiol compounds or sulfur dioxide).

7 Claims, 2 Drawing Sheets

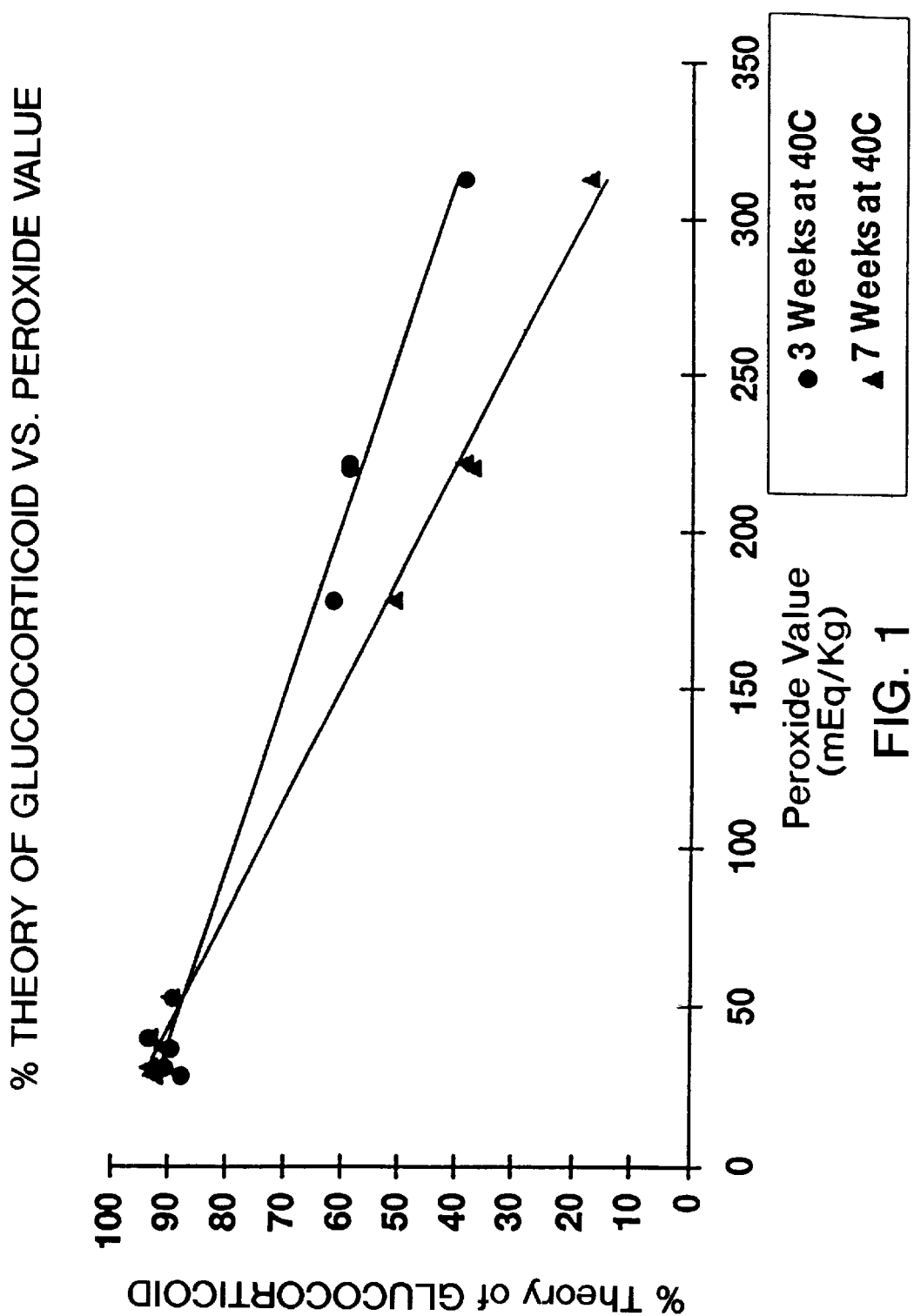

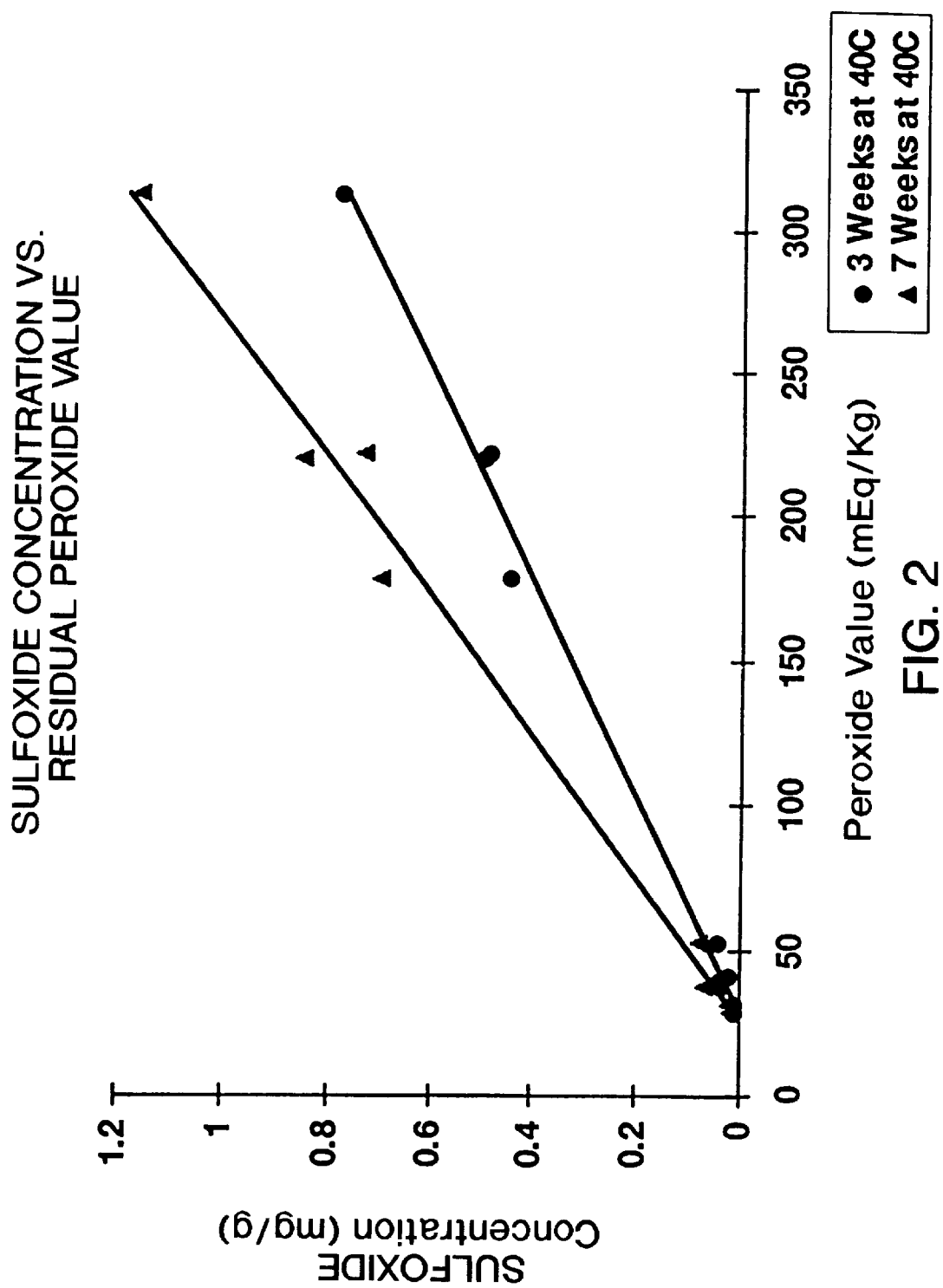

ELASTOMER TREATMENT PROCESS TO DECREASE PEROXIDE LEVELS

CROSS REFERENCE TO RELATED APPLICATIONS

This application is the national stage entry of International Application No. PCT/US98/02068, filed Feb. 4, 1998, which is a continuation-in-part of U.S. application Ser. No. 60/037,375, filed Feb. 4, 1997, abandoned.

BACKGROUND OF THE INVENTION

This invention relates to a process to reduce the residual peroxide levels in crosslinked ethylene-propylene diene monomer (EPDM) elastomer material and to inhalation devices containing EPDM gaskets made by the inventive process.

Metered-dose inhalers are commonly used to deliver medicaments to the respiratory system, particularly asthma and allergy medicaments. When a metered-dose inhaler is filled with medicament and shaken, the EPDM components are in direct contact with the medicament. The medicament is thus exposed to any residual peroxides in the gasket material. Applicants have found that these residual peroxides can cause significant oxidative degradation of the medicament. The longer the medicament is stored in the metered-dose inhaler in contact with the EPDM material, the more degradation occurs. Thus, the concentration of medicament significantly diminishes with storage time in the metered dose inhaler. This causes non-uniformity in patient dosing, because different dosages of medicament will be delivered with one inhaler actuation depending on how long the medicament has been stored in the inhaler.

Applicants have considered various approaches to reduce residual peroxides. For example, the peroxide may be reduced by use of different peroxide crosslink initiators during elastomer formulation or optimization of the elastomer curing process. The advantage of the present invention is that residual peroxides can be virtually eliminated with relative ease without the need to modify elastomer formulations or curing conditions. This avoids the need to retool the elastomer production process or to submit new information to regulatory agencies because of a change in formulation. Furthermore, Applicants' invention may be used in conjunction with other methods to further reduce residual peroxide levels.

SUMMARY

Applicants have identified a major cause of medicament degradation in medicaments stored in metered-dose inhalers and have invented a method to prevent or greatly reduce degradation. The EPDM valve components are exposed to a solution of a chemical reducing agent, such as an ethanolic solution of 2-mercaptoethanol. The reducing agent greatly diminishes the residual peroxide levels in EPDM by reducing the peroxide functional groups to the corresponding hydroxyl groups. EPDM components treated in this manner have demonstrated very low peroxide levels and, consequently, greatly improved compatibility with the pharmaceutical formulation in the inhaler. An advantage of this process is that the treated EPDM gasket material retains its favorable physical properties and its good performance in metering valves.

BRIEF DESCRIPTION OF THE DRAWINGS

FIG. 1 is a graph showing the percentage of the theoretical amount present of medicament glucocorticoid versus the level of residual peroxide.

FIG. 2 is a graph showing the concentration of degradation products versus the level of residual peroxide.

DETAILED DESCRIPTION OF THE INVENTION

The invention concerns an effective process to make the EPDM elastomer used for metering valve gasket and seats much more compatible with the pharmaceutical formulation inside the inhaler.

In the process of the invention, the EPDM elastomeric components are treated with a chemical reducing agent to eliminate residual peroxides. The reducing agent is then removed by solvent washes and/or air drying.

The invention may be used on metered-dose inhalers for use with any pharmaceutical product that is degraded or otherwise detrimentally impacted by the presence of peroxide. Preferably, the invention is used on inhalers for the delivery of glucocorticoids, more preferably on glucocorticoids having a methylthio group susceptible to oxidative degradation. Such compounds are used in the treatment of bronchial asthma. They have been shown to be chemically unstable when stored for three weeks or more in a metered-dose inhaler having EPDM gaskets. Exposure of glucocorticoid to peroxide, an effective oxidizing agent, is known to degrade it by oxidative pathways. The treatment process described in this application greatly diminishes the peroxide level of EPDM valve elastomer material and, therefore, greatly improves the chemical stability of the drug product.

The invention may be used on any polymeric material that contains residual amounts of peroxide. For purposes of this invention, Applicants define residual amounts as amounts of 5% or less by weight of the polymeric material. Of specific interest is the EPDM elastomer used in metering valve seats and gaskets. The EPDM elastomer is composed of the base EPDM polymer, several inorganic filler materials, and a dialkyl peroxide to initiate polymer crosslinking. The crosslinker initiates formation of covalent bonds between adjacent EPDM polymer molecules during the formulation curing (heating) process, yielding an elastomeric ("rubbery") material.

Any compound capable of peroxide reduction may be used under the invention as the chemical reducing agent. Preferably, compounds containing sulfur in one of its lower valence states are used. More preferably, thiol compounds such as 2-mercaptoethanol and sulfur dioxide are used.

Experimental Results

EXAMPLE 1
Residual Peroxide in EPDM Gaskets

Samples of EPDM gaskets designed for the neck portion of a metered-dose inhaler were treated with 20% 2-mercaptoethanol in ethanol solution for the same amount of time, approximately 3.5 days. The samples were then leached three times in ethanol and allowed to air dry. All treatments were performed at ambient room temperature.

A negative control sample consisting of untreated commercial EPDM neck gasket material was also included for comparison. Treated and control EPDM samples were assessed for residual peroxides by iodometric titration following the procedure described below.

The results of samples treated for 3.5 days are given in Table 1. When Applicants' process is used (example 1, Table 1) the EPDM peroxide level is about eight fold less than the level of the untreated EPDM (example 3, Table 1) and about equal to the peroxide level of uncrosslinked EPDM (example 4, Table 1). This is in contrast with the experimental control sample (example 2, Table 1) that underwent the same solvent exposure and rinsing steps as the 2-mercaptoethanol treatment sample; the experimental control sample showed essentially identical peroxide levels as the untreated sample. This indicates that the observed reduction in peroxide is attributable to Applicants' inventive process.

Method of Measuring Residual Peroxide

Most organic peroxides are reduced by iodide ions in acid solution, yielding one mole of iodine per equivalent of peroxide.

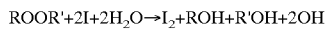

$$ROOR' + 2I^- + 2H_2O \rightarrow I_2 + ROH + R'OH + 2OH^-$$

This is the basis of the well-known technique of iodometric titration for quantitation of organic peroxides in which the liberated iodine is titrated with a standard solution of sodium thiosulfate. There are numerous specific variations reported for this method, but all generally apply to liquid or semisolid test media One complication with application of the iodometric titration method to EPDM is that the sample is a solid rubber matrix, making it difficult to ensure complete reaction with peroxide within the sample matrix.

An accepted iodometric titration method for fats and oils, American Oil Chemists' Society Official Method Cd 8-53, was evaluated for its utility in studying peroxides in EPDM. The method was further developed and modified to render it more suitable to the EPDM system. The method used to measure residual peroxide in EPDM is as follows:

Reagent Preparation: (1) A solution of acetic acid and chloroform was prepared by mixing three parts by volume of glacial acetic acid with two parts by volume of chloroform, U.S.P. grade. (2) A saturated solution of potassium iodide was prepared in water. The solution was saturated as evidenced by the presence of undissolved crystals. The solution was stored in the dark. (3) A solution of sodium thiosulfate, 0.1 N, was prepared and accurately standardized. (4) A solution of sodium thiosulfate, 0.01 N, was prepared and accurately standardized. (5) A solution of thyodene indicator was prepared.

Procedure: A sample of EPDM was pulverized in a milling device cooled with liquid nitrogen and the smaller particle fractions (about 250 micron and smaller) were collected. A 0.5 g sample of these EPDM smaller particle fractions was placed in a 250 ml Erlenmeyer flask and 30 ml of the acetic-acid chloroform solution was added to the flask. The sample was swirled in the solution with occasional shaking for 1.5 hours. Then 30 ml of distilled water was added. The solution was titrated with 0.1 N sodium thiosulfate according to standard titration practices until the yellow color had almost disappeared. Thyodene indicator solution was added and the titration was continued until the desired color change had just occurred.

Applicants found that this method is reproducible (RSD 0.6%, n=4) and suitable for evaluating peroxide levels in EPDM.

EXPERIMENT 2

Relationship Between Residual Peroxide and Glucocorticoid Stability

To determine the effect of peroxide levels on medicament stability, an experiment was carried out using (20R)-16α, 17α-Butylidenedioxy-6α, 9α-difluoro-11β-hydroxy-17β-(methylthio) androst-4-ene-3-one (a glucocorticoid sample) and EPDM gaskets used in a metered-dose inhaler. The EPDM gaskets were contacted with 20% w/w 2-mercaptoethanol solutions in either chloroform or ethanol for 3 weeks. The samples were then leached three times with their respective solvents and air dried. Control samples of EPDM were prepared by treating them with the same solvent exposure and drying steps as the 2-mercaptoethanol-treated samples.

EPDM samples of equal mass (0.7g) were placed into MDI canisters containing 15 mL of a 2.0 mg/mL solution of (20R)-16α, 17α-Butylidenedioxy-6α, 9α-difluoro-11β-hydroxy-17β-(methylthio)androst-4-ene-3-one in a vehicle of 10% w/w anhydrous ethanol in 1,1,1,2-tetrafluoroethane. The following samples were used:

1. EPDM gasket—commercial lot A
2. EPDM gasket—commercial lot B
3. EPDM seats—commercial lot B
4. EPDM crosslinked with di-tertbutyl peroxide
5. EPDM crosslinked with dicumyl peroxide
6. EPDM crosslinked with 2,5 bis(tertbutylperoxy) 2,5 dimethyl hexane
7. Uncrosslinked EPDM
8. EPDM gasket—commercial lot A—treated with 2-mercaptoethanol (in ethanol)
9. EPDM gasket—commercial lot A—treated with ethanol only
10. Control—formulation only These samples were stored in the upright (valve up) orientation at 40° C. The degradation products were measured using a validated HPLC method. The samples were analyzed after 3 weeks and 7 weeks storage at 40° for amounts of degradation products and evaluated by comparing drug recovery and degradation product levels. Results are reported in Tables 2 and 3.

Earlier work had demonstrated that the major degradation products of (20R)-16α, 17α-Butylidenedioxy-6α, 9α-difluoro-11β-hydroxy-17β-(methylthio)androst-4-ene-3-one upon exposure to EPDM gasket material are sulfoxide diastereoisomers. Monitoring these degradation products is a sensitive way to assess chemical stability of formulations, particularly when drug potency losses are small. Degradation product levels are reported in Table 3. The results showed that application of Applicants' process significantly reduced the amount of degradation products.

The glucocorticoid, (20R)-16α, 17α-Butylidenedioxy-6α, 9α-difluoro-11β-hydroxy- 17β-(methylthio)androst-4-ene-3-one, is sensitive to oxidation and degrades largely to the oxidative degradation products of sulfoxide diastereoisomers and "6-keto" derivatives when in the presence of standard formulation media. Exposure of the drug to hydrogen peroxide readily yields these sulfoxides and ultimately the sulfone.

It is clear from Tables 2 and 3 that there is less drug loss and lower levels of sulfoxide diastereoisomers in both the alternate peroxide EPDM samples and the dialkyl-peroxide EPDM samples that were treated with 2-mercaptoethanol. The samples prepared according to Applicants' invention (sample 8 in Tables 2 and 3) and stored for seven weeks showed glucocorticoid stability that was about equal to glucocorticoid stability of the samples stored in the solution alone, without any EPDM material present (example 10, Tables 2 and 3). When stability is measured by the occurrence of degradation products, Applicants' invention similarly shows great success. After seven weeks of storage, the sample containing EPDM treated by Applicants' invention showed levels of sulfoxides as low as those found in the control and in the sample with uncrosslinked EPDM.

FIGS. 1 and 2 are helpful to show the relationship between EPDM residual peroxide level and (20R)-16α, 17α-Butylidenedioxy-6α, 9α-difluoro-11β-hydroxy-17β-(methylthio)androst-4-ene-3-one stability. FIG. 1 clearly demonstrates that drug loss is inversely related, in a linear manner, to residual peroxide level at both analysis time points, three and seven weeks. FIG. 2 demonstrates that the sulfoxide degradation product levels increase with residual peroxide level at both time points. These results indicate that the mechanism of interaction between EPDM and glucocorticoid is oxidative degradation caused by residual peroxide in the EPDM.

TABLE 1

PEROXIDE LEVELS OF EPDM NECK GASKETS TREATED WITH REDUCING AGENT

| SAMPLE | PEROXIDE VALUE (mEq/Kg) |
|---|---|
| 1. EPDM Gasket - Commercial Lot A Treated with Reducing Agent | 28.3 |
| 2. EPDM Gasket - Commercial Lot A Treated with Ethanol | 220.2 |
| 3. EPDM Gasket - Commercial Lot A | 221.9 |
| 4. Uncrosslinked EPDM | 31.0 |

TABLE 2

RELATIONSHIP BETWEEN RESIDUAL PEROXIDE AND GLUCOCORTICOID POTENCY

| SAMPLE | PEROXIDE VALUE (mEq/Kg) | 3 Week Point % Theory Glucocorticoid* | 7 Week Point % Theory Glucocorticoid* |
|---|---|---|---|
| 1. EPDM Gasket - Commercial Lot A | 221.9 | 58.33 | 38.87 |
| 2. EPDM Gasket - Commercial Lot B | 312.5 | 38.42 | 16.8 |
| 3. EPDM Seats - Commercial Lot B | 178.2 | 61.43 | 50.94 |
| 4. Di-tertbutyl Peroxide EPDM | 40.7 | 93.21 | 93.41 |
| 5. Dicumyl Peroxide EPDM | 37.1 | 89.77 | 91.06 |
| 6. 2,5 bis(tertbutyl-peroxy) 2,5 dimethyl hexane EPDM | 52.8 | 89.24 | 89.39 |
| 7. Uncrosslinked EPDM | 31.0 | 90.72 | 93.510 |
| 8. EPDM Gasket - Commercial Lot A Treated with Reducing Agent | 28.3 | 87.51 | 92.29 |
| 9. EPDM Gasket - Commercial Lot A Treated with Ethanol | 220.2 | 58.41 | 37.47 |
| 10. Control (Upright MDI) | not applicable | 93.79 | 91.93 |

*(20R)-16α, 17α-Butylidenedioxy-6α, 9α-difluoro-11β-hydroxy-17β-(methylthio)androst-4-ene-3-one
Storage Conditions: 40C

TABLE 3

RELATIONSHIP BETWEEN RESIDUAL PEROXIDE AND LEVELS OF SULFOXIDE DEGRADATION PRODUCTS

| SAMPLE | PEROXIDE VALUE (mEq/Kg) | 3 Week Point AMT. (MG/G) Sulfoxides | 7 Week Point AMT. (MG/G) Sulfoxides |
|---|---|---|---|
| 1. EPDM Gasket - Commercial Lot A | 221.9 | 0.485 | 0.728 |
| 2. EPDM Gasket - Commercial Lot B | 312.5 | 0.767 | 1.1516 |
| 3. EPDM Seats - Commercial Lot B | 178.2 | 0.441 | 0.696 |
| 4. Di-tertbutyl Peroxide EPDM | 40.7 | 0.018 | 0.038 |
| 5. Dicumyl Peroxide EPDM | 37.1 | 0.038 | 0.068 |
| 6. 2,5 bis(tertbutyl-peroxy) 2.5 dimethyl hexane EPDM | 52.8 | 0.043 | 0.076 |
| 7. Uncrosslinked EPDM | 31.0 | 0.009 | 0.020 |
| 8. EPDM Gasket - Commercial Lot A Treated with Reducing Agent | 28.3 | 0.009 | 0.015 |
| 9. EPDM Gasket - Commercial Lot A Treated with Ethanol | 220.2 | 0.492 | 0.845 |
| 10. Control (Upright MDI) | not applicable | 0.003 | 0.014 |

Storage Conditions: 40C

We claim:

1. A process for reducing the amount of peroxide present in an elastomer material comprising the step of contacting the material with 2-mercaptoethanol.

2. A process according to claim 1 wherein the material is ethylene-propylene diene monomer elastomer material.

3. A process for treating elastomer material comprising a valve component to be used in metered-dose inhalers comprising the step of contacting the elastomor material in said component with a reducing agent.

4. A process according to claim 3 wherein the reducing agent is 2-mercaptoethanol.

5. A process according to claim 1 wherein the material is a gasket material for a metered-dose inhaler for the delivery of a medicament.

6. A process according to claim 5 wherein the medicament is a glucocorticoid.

7. A process according to claim 6 wherein the glucocorticoid is (20R)-16α, 17α-Butylidenedioxy-6α, 9α-difluoro-11β-hydroxy-17β-(methylthio)androst-4-ene-3-one.

* * * * *